(12) United States Patent
Lin et al.

(10) Patent No.: US 10,432,917 B2
(45) Date of Patent: *Oct. 1, 2019

(54) 3D IMAGE DISPLAY DEVICE

(71) Applicant: Theia Limited, Hsinchu County (TW)

(72) Inventors: Yu-Hsuan Lin, Hsinchu County (TW);
Tang-Hung Po, Hsinchu County (TW)

(*) Notice: Subject to any disclaimer, the term of this patent is extended or adjusted under 35 U.S.C. 154(b) by 259 days.

This patent is subject to a terminal disclaimer.

(21) Appl. No.: 15/390,769

(22) Filed: Dec. 27, 2016

(65) Prior Publication Data
US 2018/0063515 A1   Mar. 1, 2018

Related U.S. Application Data

(63) Continuation-in-part of application No. 15/252,240, filed on Aug. 31, 2016, now Pat. No. 10,182,224.

(51) Int. Cl.
*H04N 13/305* (2018.01)
*H04N 13/229* (2018.01)
*H04N 13/398* (2018.01)

(52) U.S. Cl.
CPC ......... *H04N 13/305* (2018.05); *H04N 13/229* (2018.05); *H04N 13/398* (2018.05)

(58) Field of Classification Search
CPC .... H04N 13/324; H04N 13/04; H04N 13/305; H04N 13/229; H04N 13/398; H04N 13/128; H04N 13/189; G02B 27/2214
USPC .......................................................... 348/46
See application file for complete search history.

(56) References Cited

U.S. PATENT DOCUMENTS

2017/0085865 A1*   3/2017   Sumi .................... H04N 13/324
                                                                  13/324

* cited by examiner

*Primary Examiner* — Sath V Perungavoor
*Assistant Examiner* — Patricia I Young

(57) ABSTRACT

A 3D image display device is provided. The 3D image display device includes a display module and a first lenticular array. The display module comprises a plurality of pixels and the pixels are arranged in a first direction. The first lenticular array comprises a plurality of strip-shaped first lenticular lenses and an angle between an extension direction of the first lenticular lens and the first direction is larger or equal to 45 degrees.

8 Claims, 18 Drawing Sheets

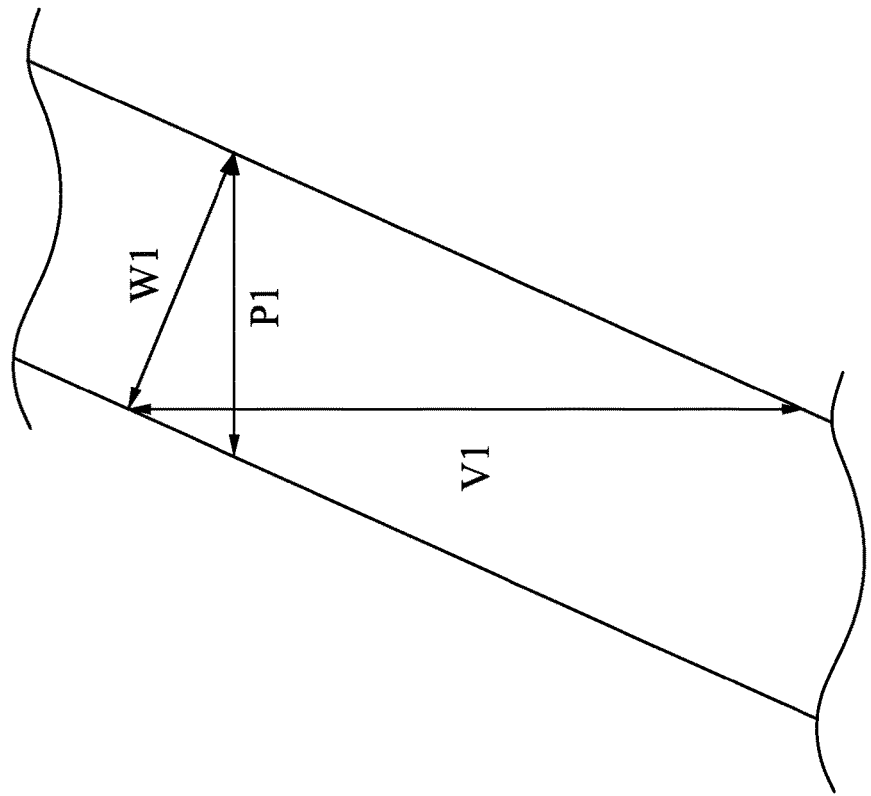

3D IMAGE DISPLAY DEVICE

BACKGROUND OF THE INVENTION

Field of Invention

The present invention relates to an image display device, especially relates to a 3D image display device.

Description of Related Art

Autostereoscopic display device is for a user to view 3D images without wearing glasses. A lenticular array is one of the devices to achieve 3D images. Referring to FIG. 1, FIG. 1 illustrates a conventional 3D image system 100. The 3D image system 100 includes a lenticular array 110 and a display module 120. The lenticular array 110 includes a plurality of lenticular lenses 112. The display module 120 is provided with multiple image line sets 130 thereon. Each image line set 130 is composed of multiple image lines 132. Each image line set 130 corresponds to a respective lenticular lens 112. Furthermore, referring to FIG. 2, a plurality of pixels 122 is disposed on the display module 120. Each pixel 122 includes three sub-pixels, i.e. red, green, and blue (represented as R, G, B respectively in FIG. 2). On the display module 120, the pixels 122 are arranged along a predetermined direction. If an extension direction of the lenticular lens 112 is as same as the arrangement direction of the pixels 122, a moiré phenomenon will occur.

In order to avoid the moiré phenomenon, the industry currently arranges the extension direction of the lenticular lens 112 and the arrangement direction of the pixels 122 at an angle and the angle is between 18~23 degree. However, the way leads to the resolution drop. In order to solve the resolution drop, the industry generally decreases the width of the lenticular lens 112, but resulting in afterimages. Therefore, how to avoid the moiré phenomenon without the resolution drop and the afterimage is worthy to overcome this problem for the person having ordinary skill in the art.

SUMMARY OF THE INVENTION

One aspect of the invention is to provide a 3D image display device. The 3D image display device meets the demand for avoiding the moiré phenomenon without the resolution drop and the afterimage.

To achieve the foregoing and other aspects, a 3D image display device is provided. The 3D image display device includes a display module and a first lenticular array. The display module comprises a plurality of pixels and the pixels are arranged in a first direction. The first lenticular array comprises a plurality of strip-shaped first lenticular lenses and an angle between an extension direction of the first lenticular lens and the first direction is larger or equal to 45 degrees.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A and FIG. 4B show the different conditions depending on different angles between the extension direction of the lenticular lens and the first direction.

DESCRIPTION OF THE INVENTION

Figure 1:
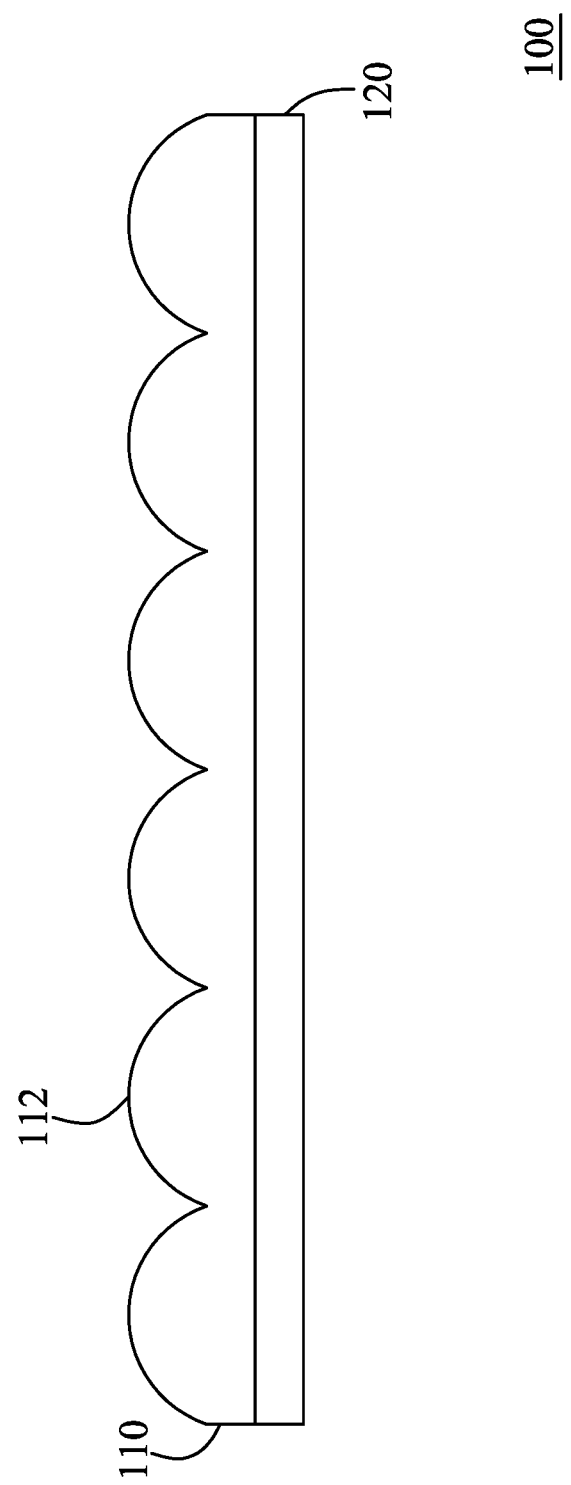
FIG. 1 illustrates a conventional 3D image system.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 3A:
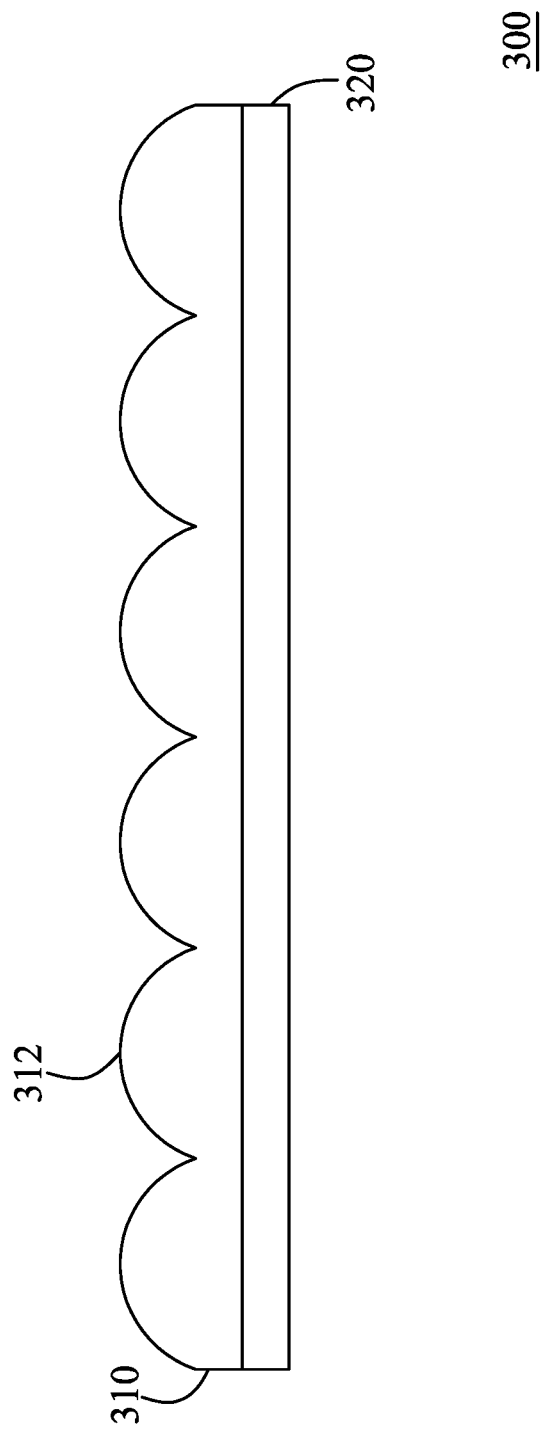
FIG. 3A illustrates a 3D image display device in an embodiment of the instant invention.
Figure 3B:
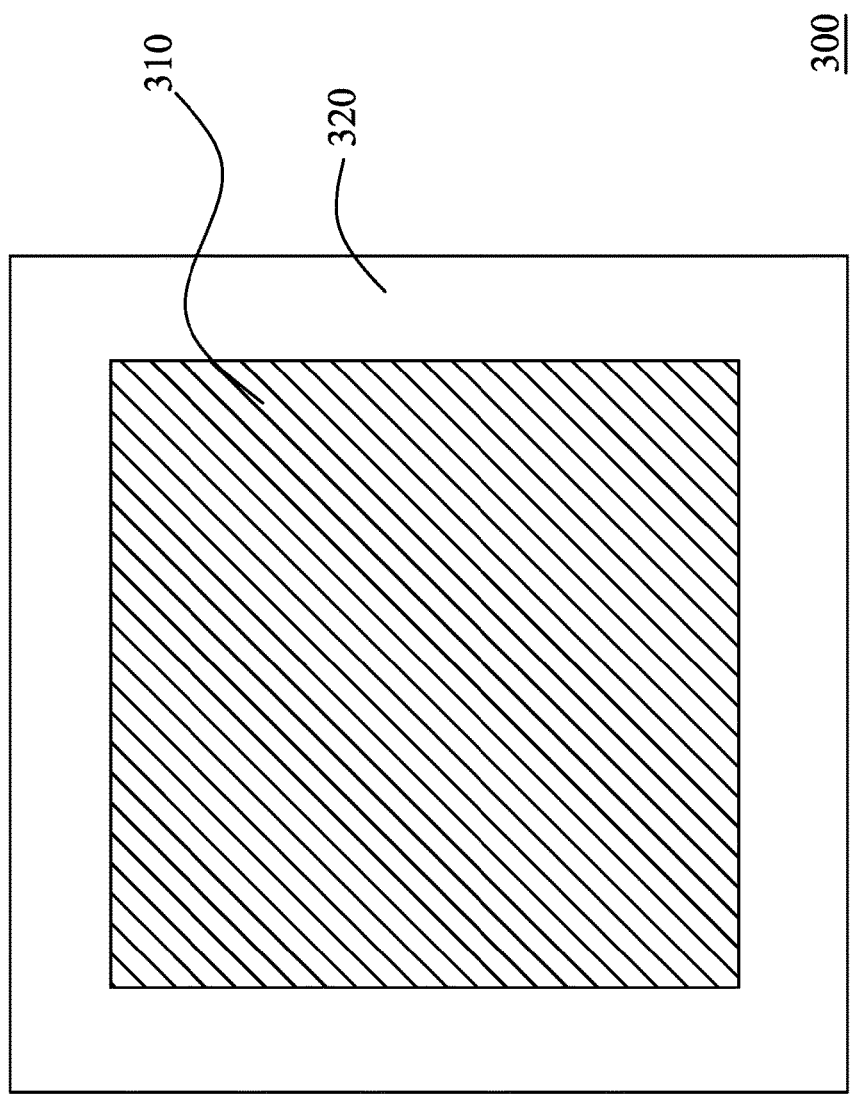
FIG. 3B illustrates a top view of the 3D image display device.
Figure 3C:
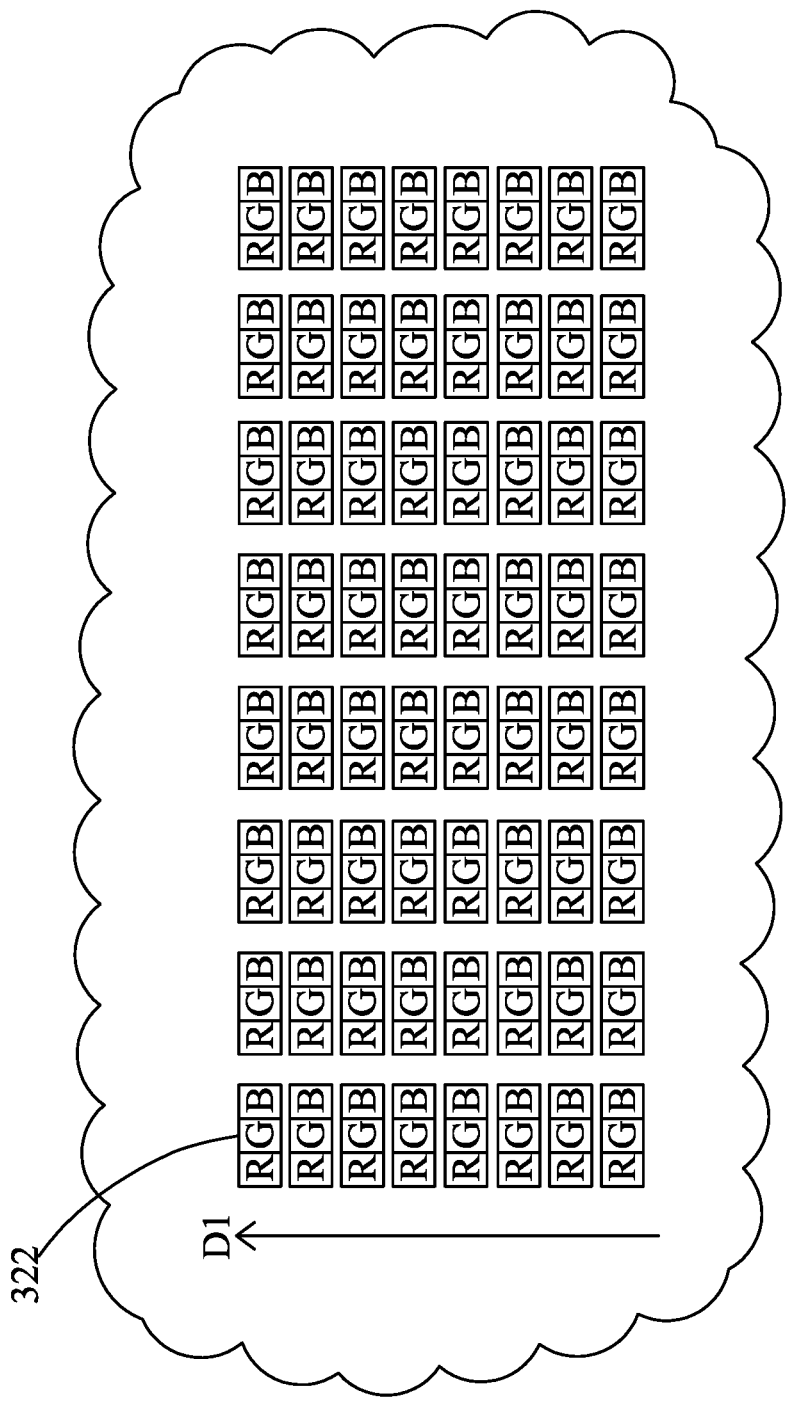
FIG. 3C illustrates a schematic diagram of pixel geometry on the 3D image display device.
Figure 4B:
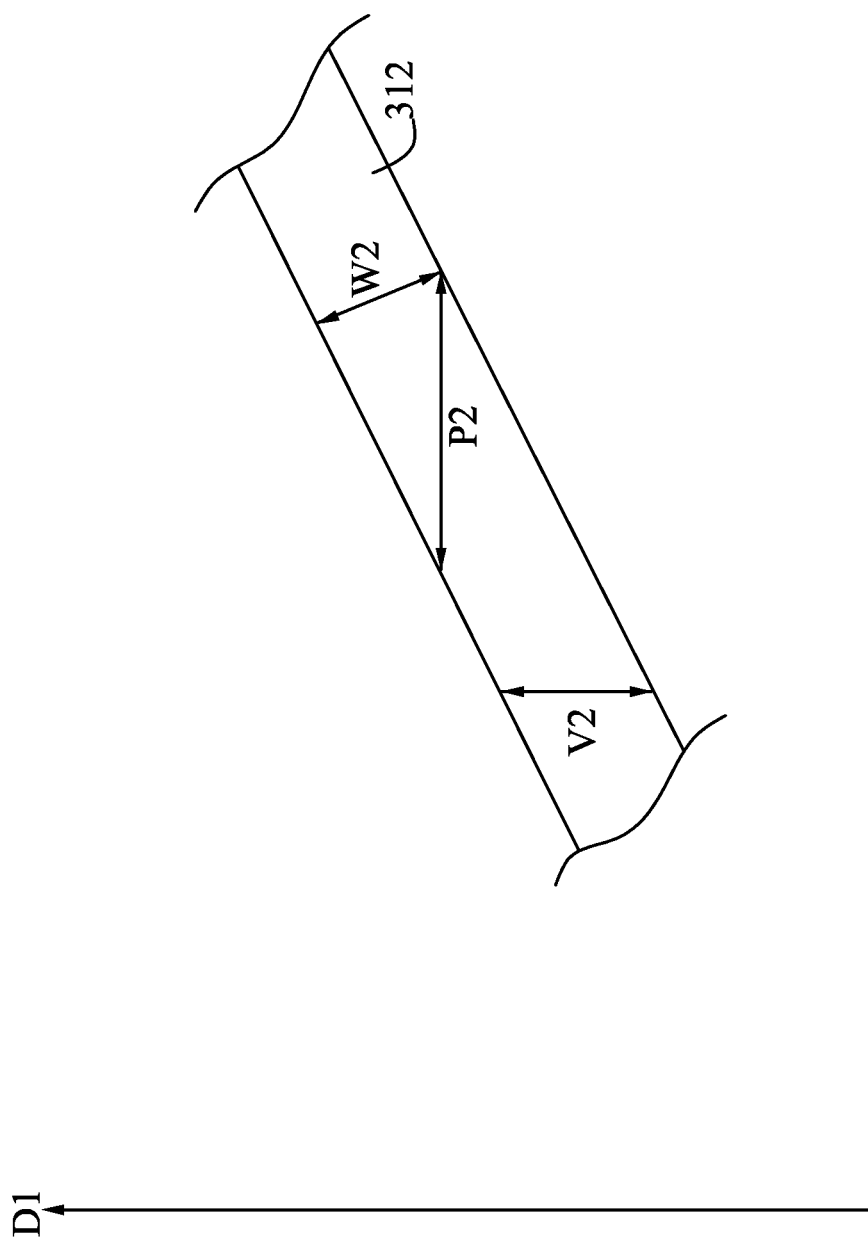

Referring to FIG. 3A, FIG. 3A illustrates a 3D image display device in an embodiment of the instant invention. The 3D image display device 300 includes a display module 320 and a first lenticular array 310. The first lenticular array 310 includes a plurality of strip-shaped first lenticular lens 312. Referring to FIG. 3B and FIG. 3C, FIG. 3B illustrates a top view of the 3D image display device, and FIG. 3C illustrates a schematic diagram of pixel geometry on the 3D image display device. As shown in FIG. 3B and FIG. 3C, an angle between the extension direction of the first lenticular lens 312 and a first direction D1 is 45 degrees. Furthermore, the angle between the extension direction of the first lenticular lens 312 and a first direction D1 can be larger than 45 degree. The display module 320 is an active display module, for example: LCD. As shown in FIG. 3C, a plurality of pixels 322 is disposed on the display module 320 and the pixels 322 are arranged along the first direction D1. Each pixel 322 includes a plurality of sub-pixels and the sub-pixels are red sub-pixel R, green sub-pixel G, and blue sub-pixel B respectively in FIG. 3C. In the following, how to avoid the moiré phenomenon without the resolution drop and the afterimages in the invention is described. Please compared FIG. 4A and FIG. 4B, FIG. 4A and FIG. 4B show the different conditions depending on different angles between the extension direction of the first lenticular lens 312 and the first direction D1 are different. In FIG. 4A, an width of the first lenticular lens 312 is W1, an angle between the extension direction of the first lenticular lens 312 and the first direction is θ1, a lateral pitch P1 of the first lenticular lens 312 is W1/cos θ1, and a vertical pitch V1 of the first lenticular lens 312 is W1/sin θ1. In FIG. 4B, a width of the first lenticular lens 312' is W2, an angle between the extension direction of the first lenticular lens 312' and the first direction D1 is θ2, a lateral pitch P2 of the first lenticular lens 312' is W2/cos θ2, and a vertical pitch V2 of the first lenticular lens 312' is W2/sin θ1. In the embodiment, P1 is equal to P2, θ1 is 22.5 degree, and θ2 is 67.5 degree. Thus, the width W1 is about 2.4 times of the width W2, and the vertical pitch V2 is about 0.17 time of the vertical pitch V1.

To sum up, if the angle between the first lenticular lens and the first direction D1 is set larger and the lateral pitch is equal to the other, the width and the vertical pitch will become smaller. In other words, if the angle between the first lenticular lens and the first direction D1 is set larger and the lateral resolution is equal to the other (due to equal lateral pitch), the vertical resolution will become higher. However, for the first lenticular lens 312' in FIG. 4B, the afterimage is easy to occur because of smaller lateral pitch V2. However, by the following description of the method for creating 3D image, the afterimage phenomenon can be avoided.

Figure 5:
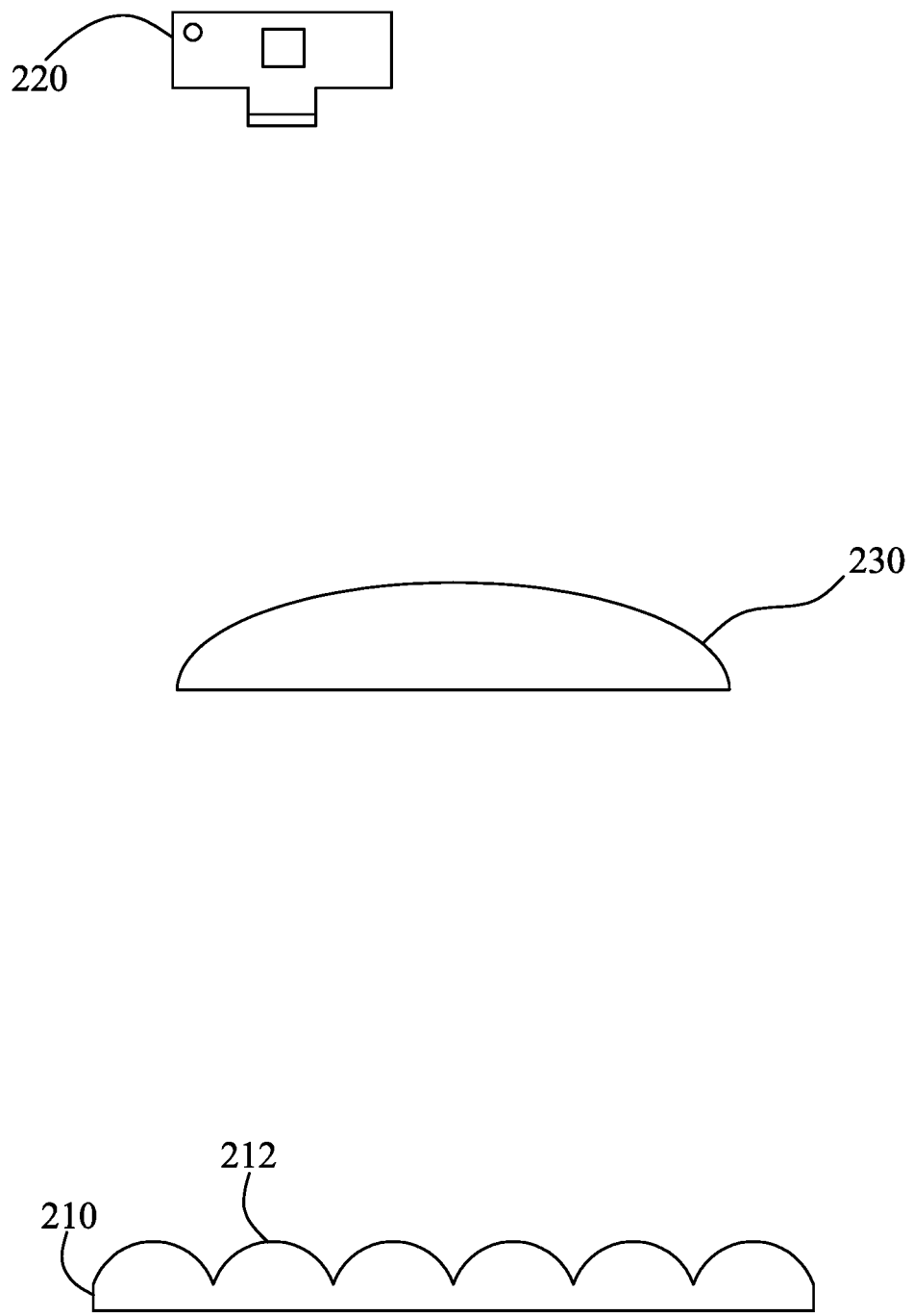
FIG. 5 illustrates an image capture system in accordance with an embodiment of the present invention.

Please refer to FIG. 5, FIG. 5 illustrates an image capture system in accordance with an embodiment of the present invention. The image capture system 200 is used to create 3D images. The image capture system 200 includes a capture device 220 and a second lenticular array 210. The second lenticular array 210 includes a plurality of strip-shaped second lenticular lenses 212. A subject 30 to be captured is disposed between the capture device 220 and the second lenticular array 210. The subject 30 to be captured may be a 3D model or a human face. However, the subject 30 can be selectively placed below the second lenticular array 210. In other words, the lenticular array 210 can be selectively placed between the capture device 220 and the subject 30. In the embodiment, the size of the first lenticular array 310 is as same as that of the second lenticular array 210.

Figure 6A:
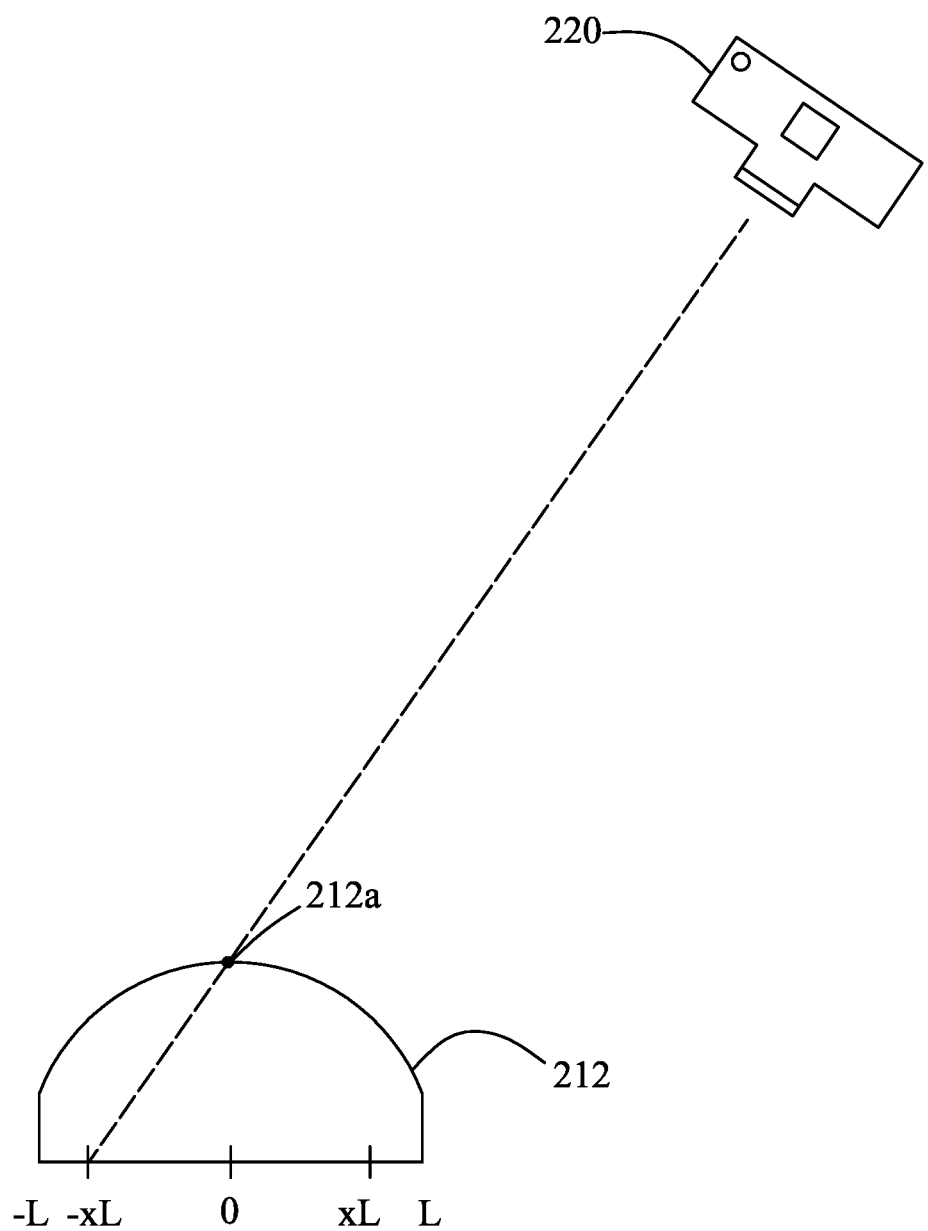
FIG. 6A and FIG. 6B are schematic views illustrating the capture device, the lenticular lens and the subject to be captured in the operation in accordance with an embodiment of the present invention.
Figure 6B:
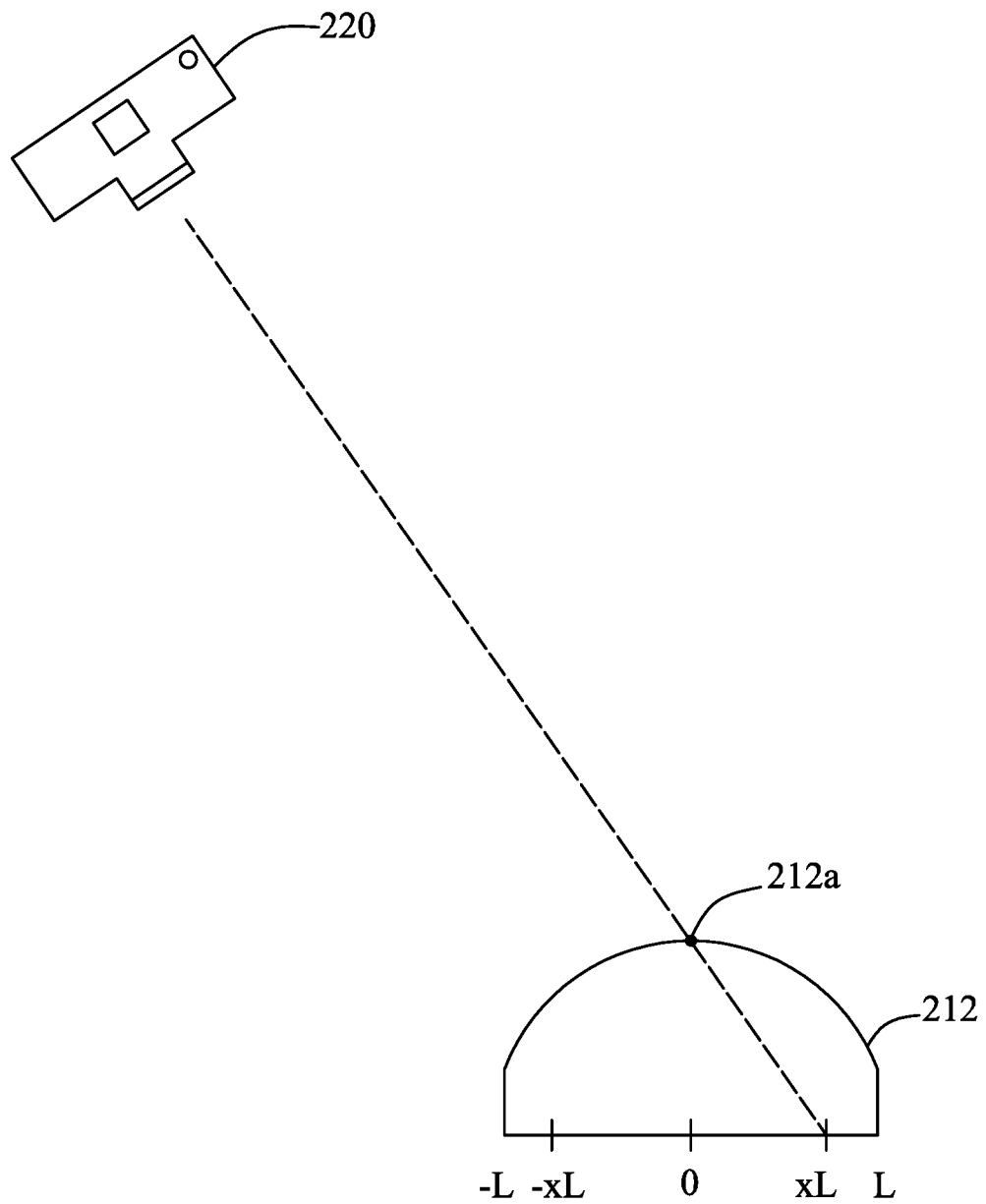

The method for creating a 3D image is described hereinafter. In order to understand the features of the present invention more plainly, FIG. 6A and FIG. 6B illustrate only one second lenticular lens 212 and the subject 30 to be captured is not shown in FIG. 6A and FIG. 6B. However, the person having ordinary skill in the art can know that when the capture device 220 is used to capture, the subject 30 is to be captured.

Figure 7:
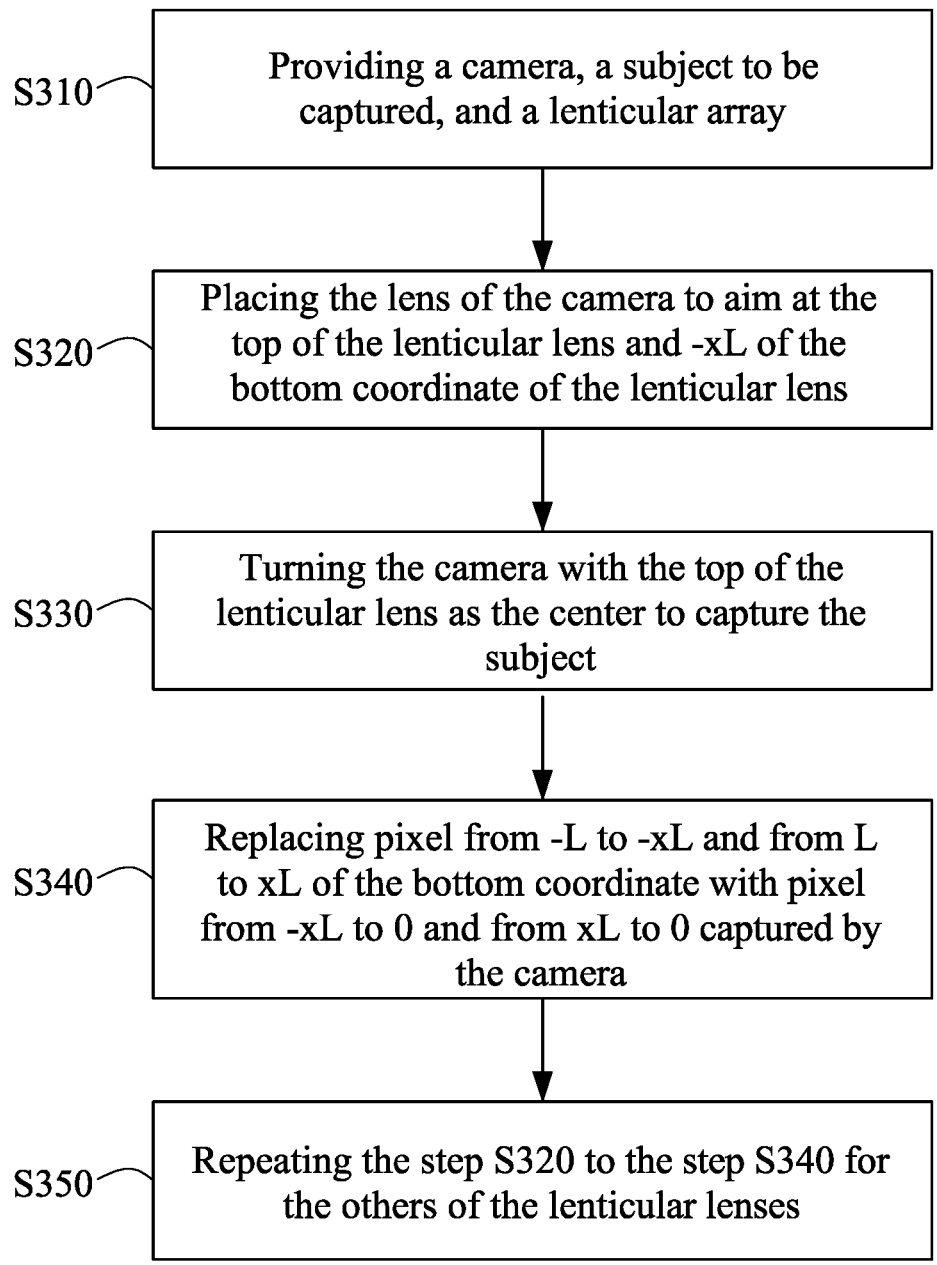
FIG. 7 is a flowchart illustrating a method for creating 3D image according to one embodiment of the present invention.

First, referring to FIG. 7, performing Step S310, providing the capture device 220, the subject 30 to be captured, and the lenticular array 210 as shown in FIG. 5. Next, referring to FIG. 6A and FIG. 7, performing Step S320, the lens of the capture device 220 is aimed at the top 212a of the second lenticular lens 212 and −xL of the bottom coordinate of the second lenticular lens 212. That is to say, the lens of the capture device 220, the top 212a of the second lenticular lens 212 and −xL of the bottom coordinate of the second lenticular lens 212 are in alignment (as denoted by the dashed line in the drawing). As shown in FIG. 6A, the length of the bottom of the second lenticular lens 212 is 2L. In this embodiment, the center of the bottom coordinate is set as 0, the leftmost end is set as −L, and the rightmost end is set as L. The person having ordinary skill in the art can know that the leftmost end may be set as L, and the rightmost end may be set as −L. Preferably, the value of x is greater than 0.5. In this embodiment, the value of x is 0.75.

Figure 2:
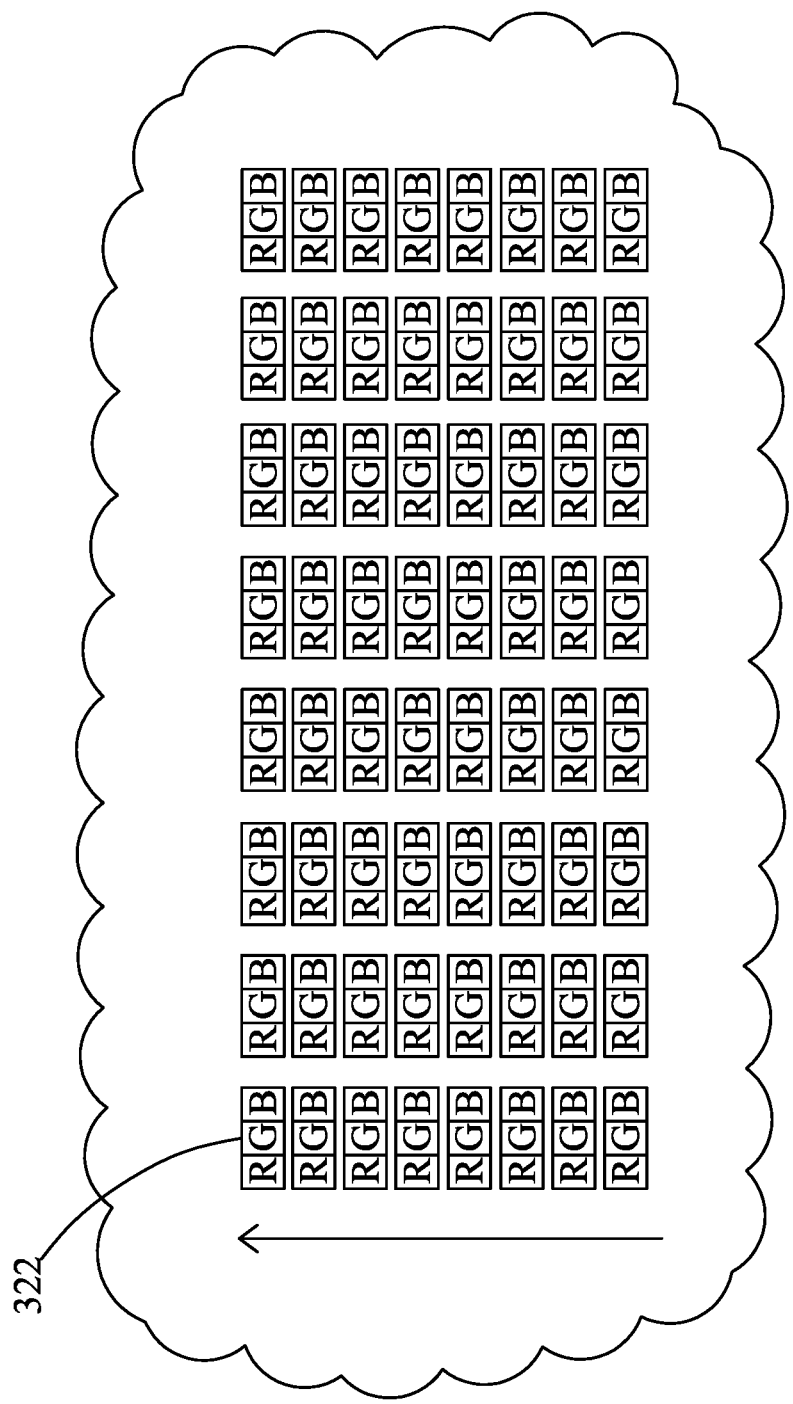
FIG. 2 illustrates a schematic diagram of pixel geometry on the display module.

Next, performing Step S330, the capture device 220 is turned counterclockwise with the top of the second lenticular lens 212 as the center to capture the subject 30 (as shown in FIG. 2) until the lens of the capture device 220 is aimed at xL of the bottom coordinate of the second lenticular lens 212 as shown in FIG. 6B. Furthermore, the capturing procedure of the capture device 220 is not limited in the procedure as described in the step S320~step S330, i.e. taking place from −xL to xL sequentially, just to capture the subject 30 until a capturing for a plurality of pixels corresponding to the range from −xL to xL of the bottom coordinate of the second lenticular lens 212 is finished. In the embodiment, the pixel is a long-strip form and a length thereof is as long as the second lenticular lens 212.

Next, performing Step S340, using a mapping function the pixels corresponding to the range from −L to −xL and from L to xL of the bottom coordinate are mapped with the pixels corresponding to the range from −xL to 0 and from xL to 0 captured by the capture device 220. In particular, when the capture device 220 completes the action of capturing from −xL to xL, it won't capture the range from −L to −xL and from L to xL. On the contrary, it adopts soft simulation. The pixels corresponding to the range from −xL to 0 and from 0 to xL captured by the capture device 220 are copied in proportion to the range from −L to −xL and from L to xL. For example, if x is 0.75, the pixels corresponding to the range from 0 to 0.75L captured by the capture device 220 is compressed in the ratio 3:1 and copied to the pixels corresponding to the range from 0.75L to L. Similarly, the pixels corresponding to the range from 0 to −0.75L captured by the capture device 220 is copied to the pixels corresponding to the range from −0.75L to −L. Besides, it is noted that Step S330 and Step S340 can be performed simultaneously. That is, when the capture device 220 captures, the software performs simulation simultaneously.

Afterward, performing Step S350, the capture device 220 is displaced, enabling the lens of the capture device 220 to aim at the top of another lenticular lens, and Steps S320 to S340 are repeated until all the second lenticular lenses 212 on the second lenticular array 210 (as shown in FIG. 1) has been captured.

Figure 10A:
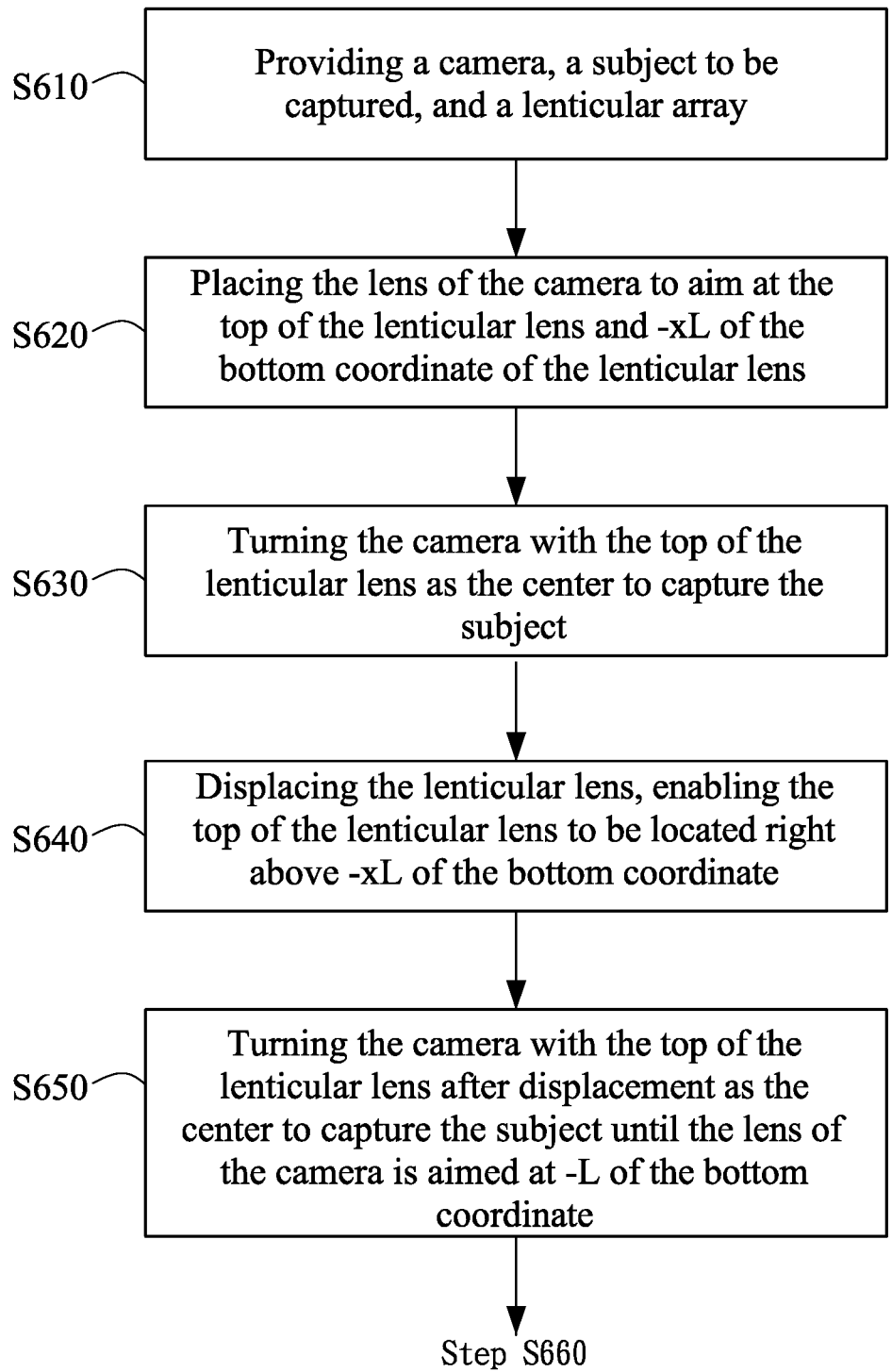
FIG. 10A and FIG. 10B are a flowchart illustrating a method for creating 3D image according to another embodiment of the present invention.

Another method for creating a 3D image is described hereinafter. This method is substantially similar to the aforesaid method with the exceptions described hereinafter. Unless otherwise noted, like reference numerals denote like elements throughout the attached drawings and the written description, and thus, descriptions thereof will not be repeated. First, referring to FIG. 10A and FIG. 5, performing Step S610, the capture device 220, the subject 30 to be captured, and the second lenticular array 210 as shown in FIG. 5 are provided. As in the first embodiment, the subject 30 can be selectively placed below or above the second lenticular array 210. Next, referring to FIG. 6A and FIG.

10A, performing Step S620, the lens of the capture device 220 is aimed at the top 212a of the second lenticular lens 212 and −xL of the bottom coordinate of the second lenticular lens 212. Next, performing Step S630, the capture device 220 is turned counterclockwise with the top of the second lenticular lens 212 as the center to capture the subject 30 (as shown in FIG. 5) until the lens of the capture device 220 is aimed at xL of the bottom coordinate of the second lenticular lens 212 as shown in FIG. 6B. As in the first embodiment, the capturing procedure of the capture device 220 is not limited in the procedure as described in the step S320~step S330, ie. taking place from −xL to xL sequentially, just to capture the subject 30 until a capturing for a plurality of pixels corresponding to the range from −xL to xL of the bottom coordinate of the second lenticular lens 212 is finished. In the embodiment, the pixel is a strip-shaped form and a length thereof is as long as the second lenticular lens 212.

Figure 9A:
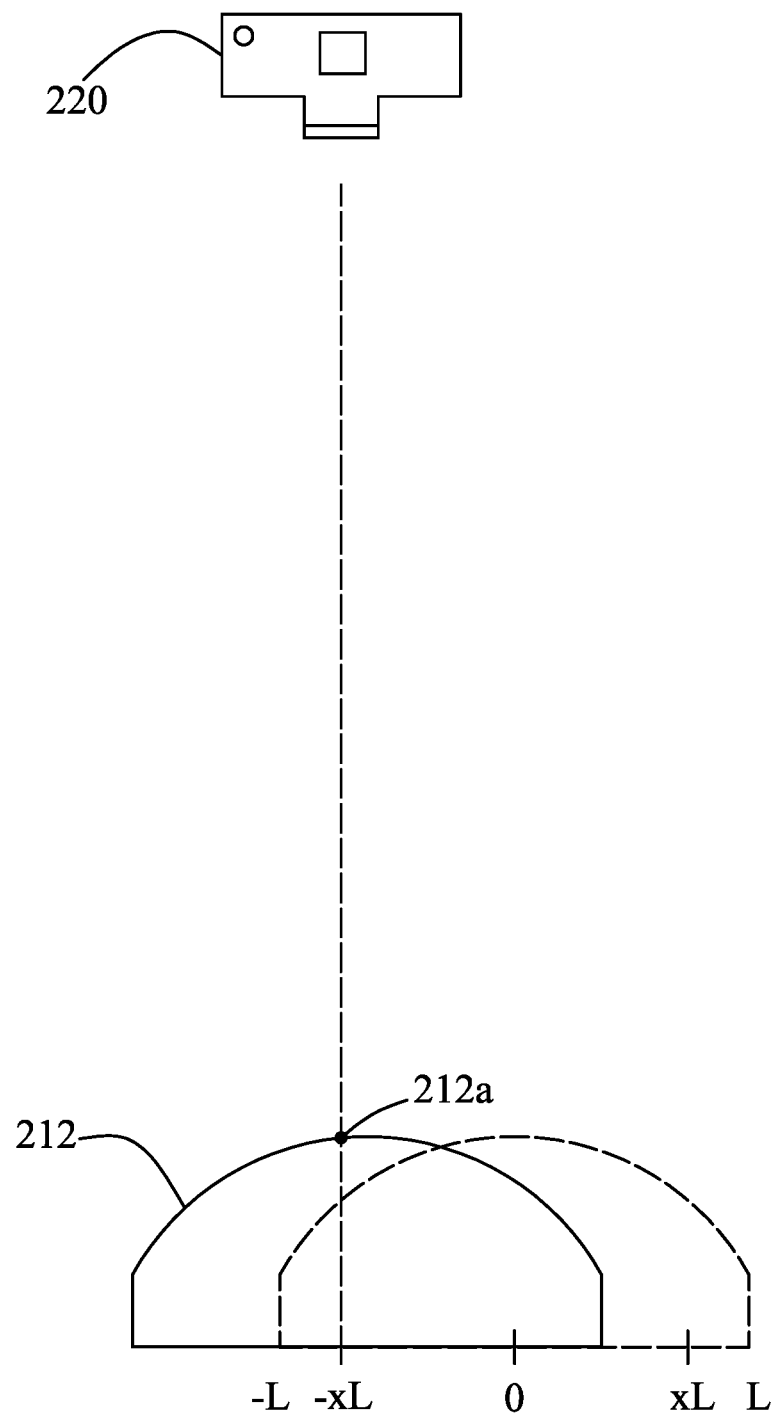
FIG. 9A to FIG. 9D are schematic views illustrating the capture device, the lenticular lens and the subject to be captured in the operation in accordance with another embodiment of the present invention.
Figure 9B:
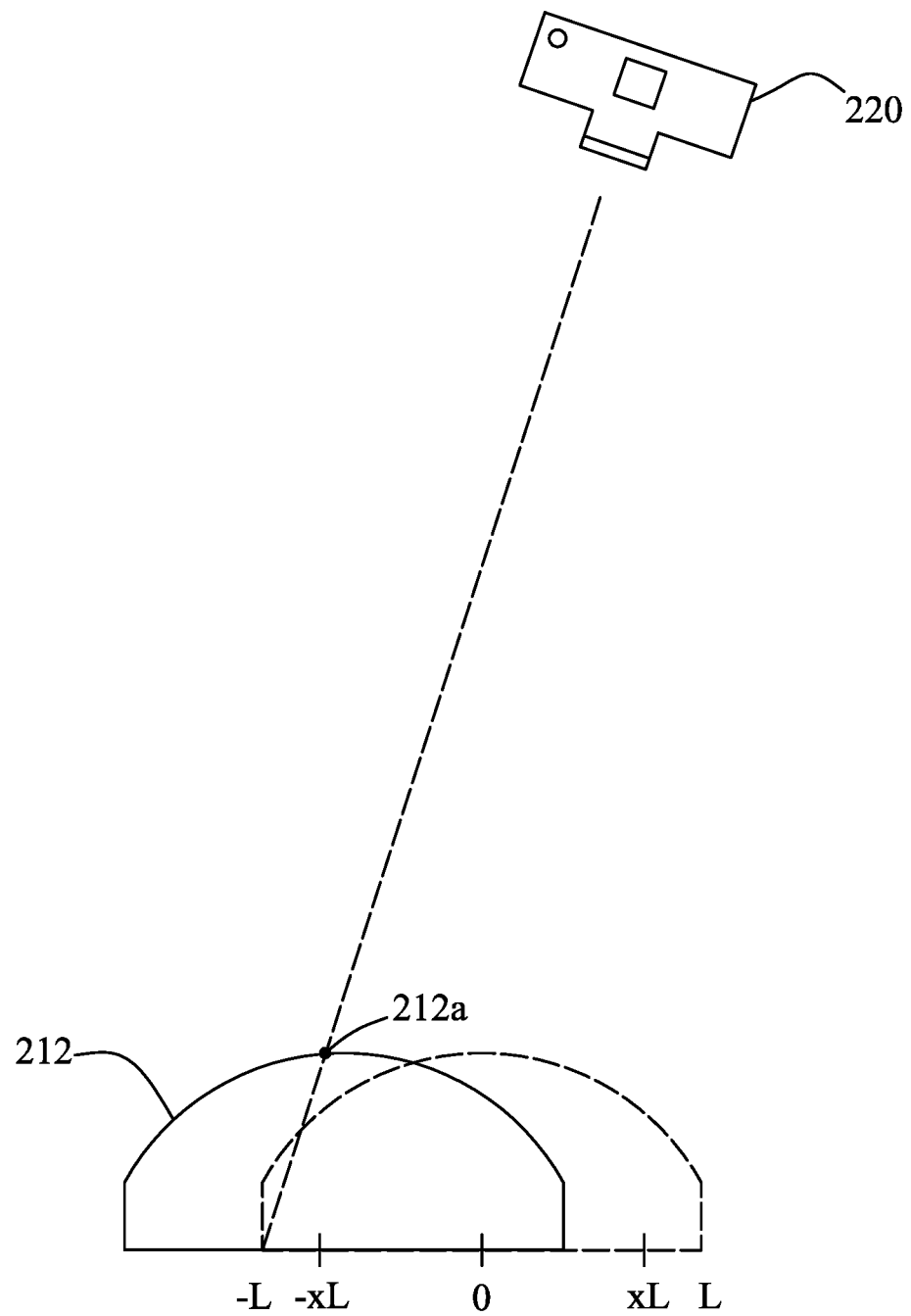
Figure 9C:
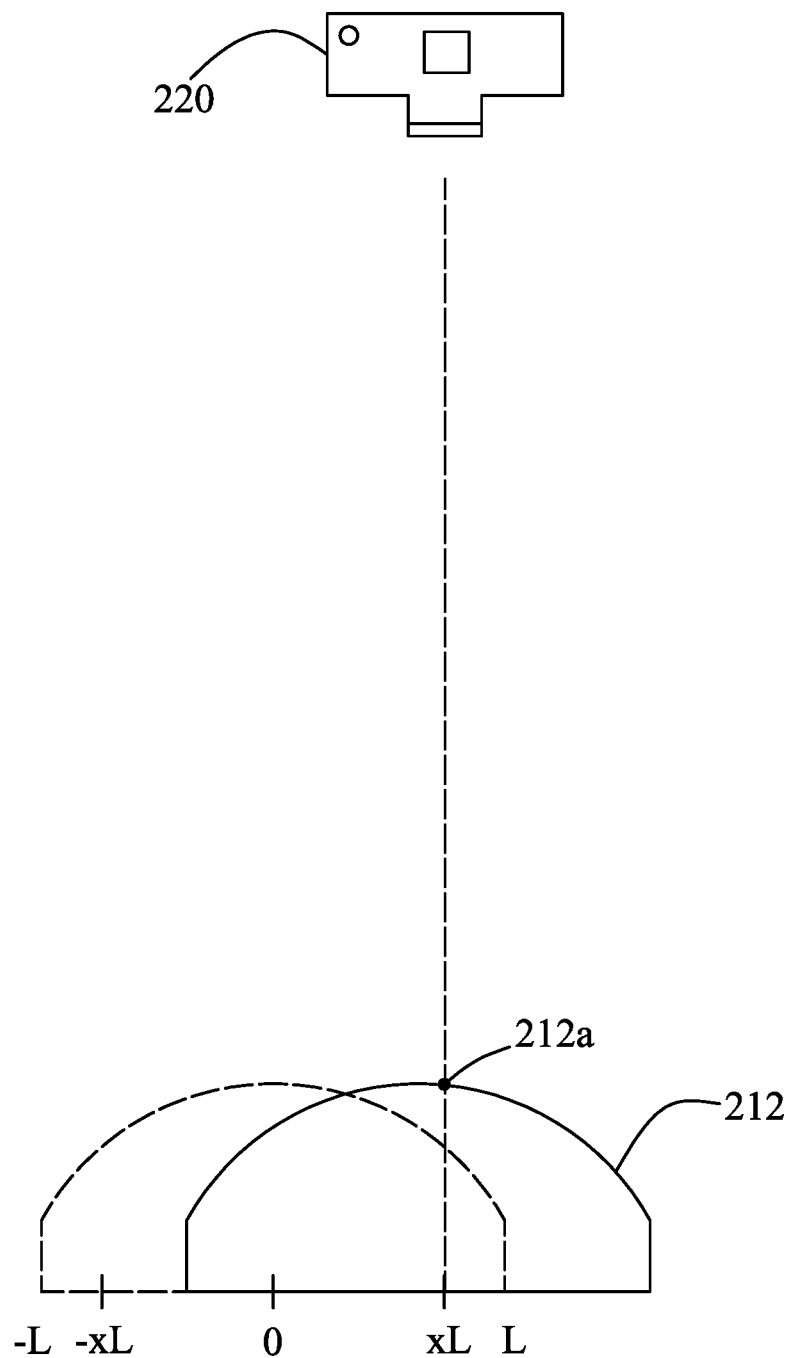
Figure 9D:
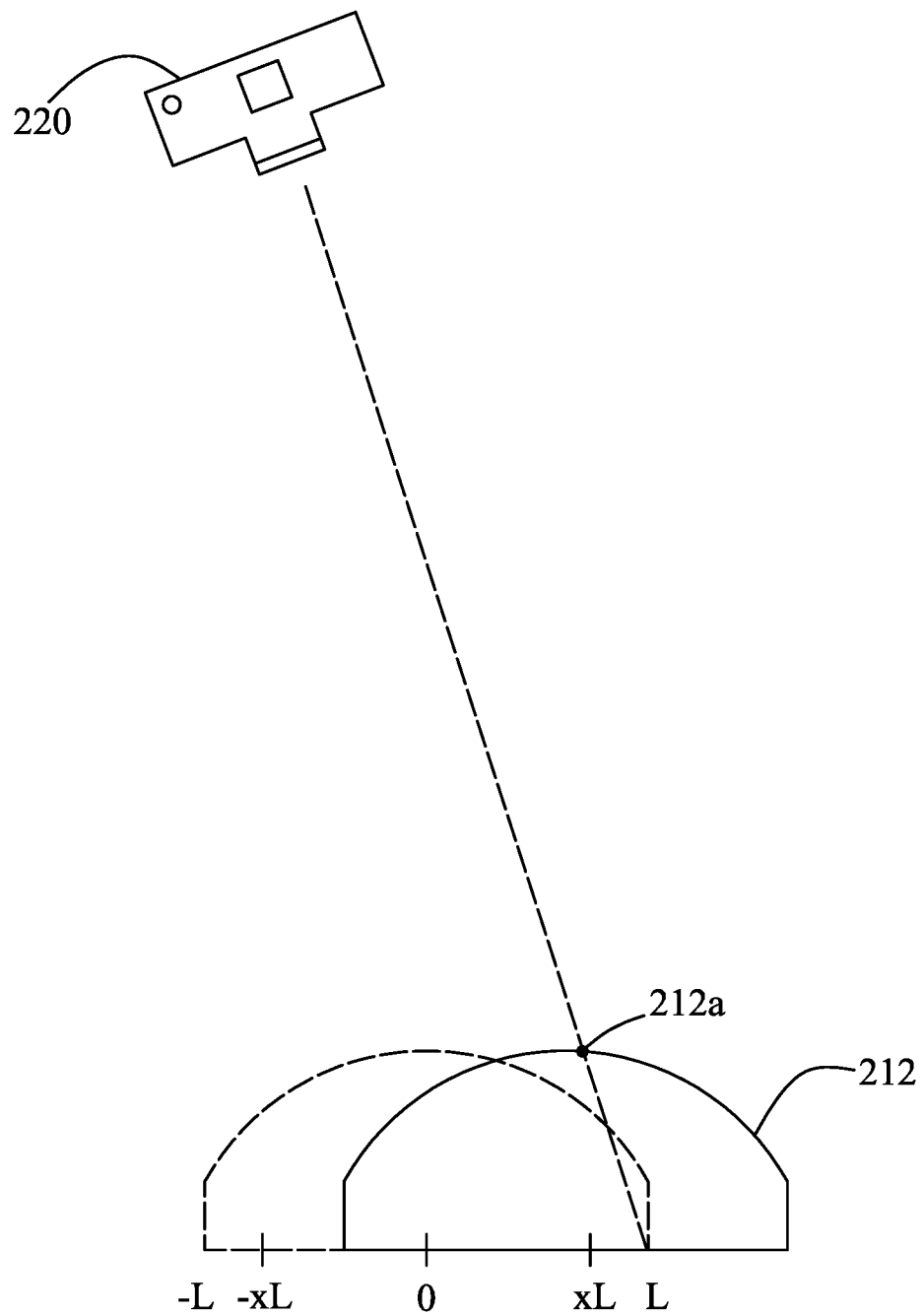
Figure 10B:
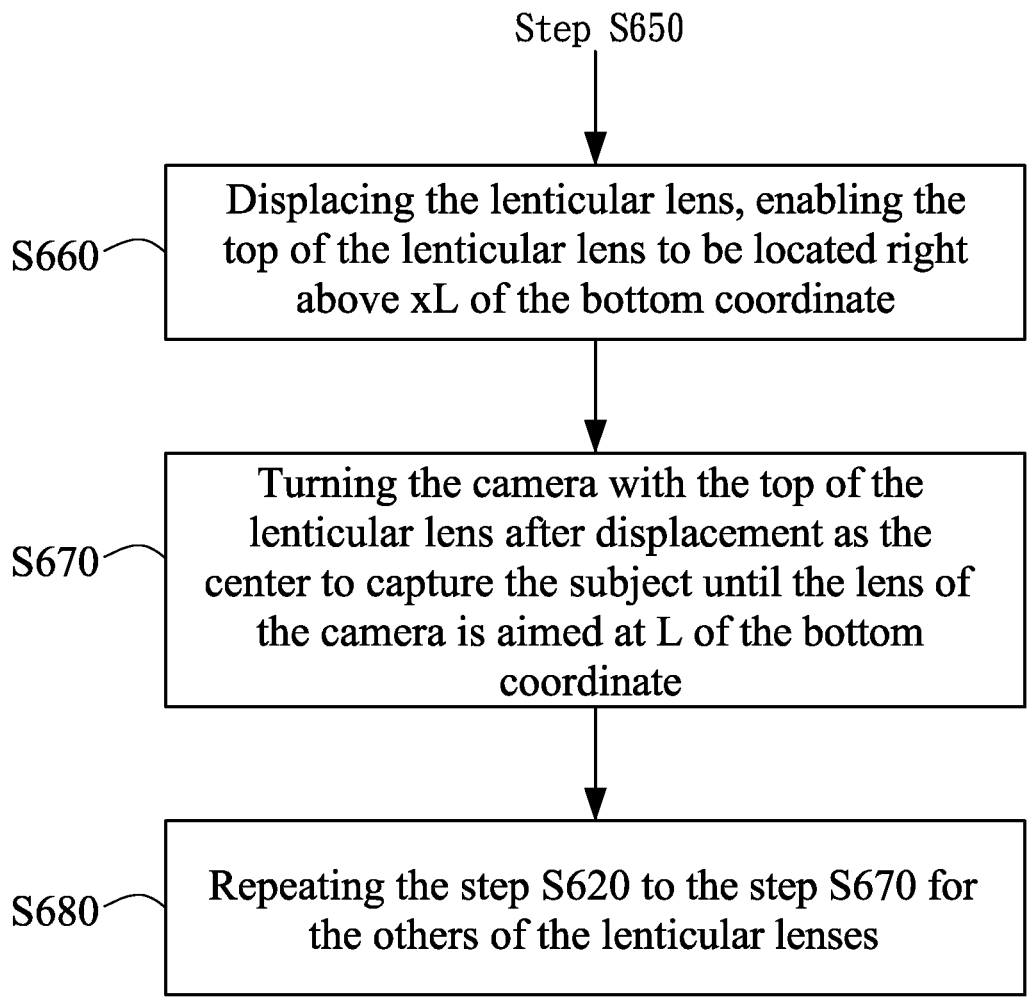

Next, performing Step S640, as shown in FIG. 9A, the capture device 220 is displaced, enabling the capture device 220 to be located right above −xL of the bottom coordinate. Next, performing Step S650, the capture device 220 is laterally moved to capture the subject 30 (as shown in FIG. 5) until the lens of the capture device 220 is aimed at −L of the bottom coordinate of the second lenticular lens 212 as shown in FIG. 9B. Afterward, as shown in FIG. 10B and FIG. 9C, performing Step S660, the capture device 220 is displaced, enabling the capture device 220 to be located right above xL of the bottom coordinate. Then, performing Step S670, the capture device 220 is laterally moved to capture the subject 30 (as shown in FIG. 5) until the lens of the capture device 220 is aimed at L of the bottom coordinate as shown in FIG. 9D.

Afterward, performing Step S680, the capture device 220 is displaced, enabling the lens of the capture device 220 to aim at the top of another lenticular lens, and Steps S620 to S670 are repeated until all the lenticular lenses 212 on the lenticular array 210 (as shown in FIG. 5) has been captured.

It is noted that when capturing the pixels corresponding to the range from −xL to −L and from xL to L the capturing procedure of the capture device 220 is not limited in the procedure as described in the step S640~step S650, just to capture the subject 30 without aimed at the top 212a of the second lenticular lens 212.

In the aforesaid method for creating a 3D image, Step S310 to Step S350 and Step S610 to Step 680 are preferably performed by software simulation. That is, the structure and function of each component (the capture device 220 and the lenticular array 210) of the image capture system 200 can be simulated by software. Furthermore, the subject 30 to be captured can be drawn by 3D software, or it can be captured by a 3D camera and then inputted to the software. In this embodiment, the software for performing Step S310 to Step S350 and Step S610 to Step 680 may be Unity, Unreal, OGRE, OpenSceneGraph, and so on.

Figure 8:
FIG. 8 illustrates an embodiment of the 3D image system of the present invention.
Figure 8:
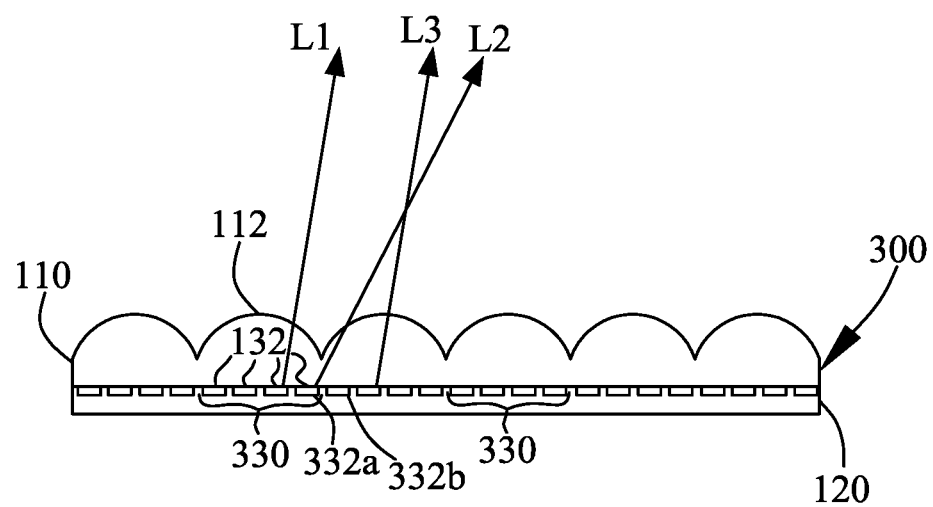

Referring to FIG. 8, FIG. 8 illustrates an embodiment of the 3D image system of the present invention. In FIG. 8, like reference numerals denote like elements as FIG. 3A, and thus, descriptions thereof will not be repeated. After Step S310 to Step S350 and Step S610 to Step 680 are performed, the pixel captured by the capture device 220 is outputted to the display module 320 as shown in FIG. 8 to form multiple image line sets 330.

As shown in FIG. 8, the image line 332a emitting the light L2 and the image line 332b emitting the light L3 correspond to the pixel from L to xL and from −L to −xL, respectively. As known from the aforesaid embodiment, the pixel from L to xL and from −L to −xL is specially proceeded. Compared to the image line 132a and the image line 132b, the image line 332a is more similar to the image line 332b. As shown in FIG. 8, when the user takes a view, even though the light L2 and the light L3 are overlapped, there is no or less afterimage occurred because the image line 332a is more similar to the image line 332b compared to the image line 132a and the image line 132b. This solves the problem of afterimage effectively.

Furthermore, in the foregoing embodiment the image capture system 200 includes only one capture device 220, but the image capture system 200 may include a plurality of capture devices 220. For example, the number of the capture devices 220 is identical to the number of the lenticular lenses 212. In this way, Step S310 to Step S350 and Step S610 to Step 680 are performed for all the lenticular lenses 212 simultaneously so as to expedite the processing time.

In a preferred embodiment, the 3D image display device 300 is used in a handheld device, and the handheld device is such as a cell phone or tablet computer. For example, the display module 320 of the 3D image display device 300 is a part (e.g. a screen) of the handheld device and the first lenticular array 310 is attached on the screen of the handheld device.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A 3D image display device, comprising:
   a display module comprising a plurality of pixels and an image composed of the pixels, wherein the pixels is arranged in a first direction; and
   a first lenticular array comprising a plurality of strip-shaped first lenticular lenses and an angle between an extension direction of the first lenticular lens and the first direction is larger or equal to 45 degree;
   wherein the image composed of the pixels is created by the steps of:
   (a) providing a capture device, a subject to be captured, and a lenticular array, wherein the lenticular array comprises a plurality of strip-shaped lenticular lenses, a length of a bottom of each lenticular lens is 2L, and a center of the bottom is set as 0;
   (b) placing the capture device to aim at a top of one of the lenticular lenses and a point between −xL to xL of a bottom coordinate of the lenticular lens, and capturing the subject until a capturing for a plurality of pixels corresponding to the range from −xL to xL of the bottom coordinate of the lenticular lens is finished, wherein the value of x is smaller than 1 but greater than 0;
   (c) mapping pixels corresponding to the range from from −xL to 0 and from xL to 0 captured by the capture device to pixels corresponding to a range from −L to −xL and from L to xL of the bottom coordinate; and
   (d) repeating the steps (b) to (c) for the others of the lenticular lenses.

2. The 3D image display device as claimed in claim 1, wherein in the step (b) the value of the x is greater than 0.5.

3. The 3D image display device as claimed in claim 1, wherein in the step (a) the subject to be captured is disposed between the capture device and the lenticular array.

4. The 3D image display device as claimed in claim 1, wherein in the step (b) turning the capture device with the top of the lenticular lens as the center to capture the subject.

5. The 3D image display device as claimed in claim 1, wherein the steps (a) to (d) are performed by software simulation.

6. The 3D image display device as claimed in claim 5, wherein in the step (a) a plurality of capture devices is provided.

7. The 3D image display device as claimed in claim 6, wherein in the step (a) each capture device corresponds to a respective one of the lenticular lenses.

8. The 3D image display device as claimed in claim 1, wherein in the step (c) replacing pixels from −L to −xL and from L to xL of the bottom coordinate with pixels from −xL to 0 and from xL to 0 captured by the camera.

* * * * *